United States Patent [19]
Cefarelli et al.

[11] 4,405,201

[45] Sep. 20, 1983

[54] FIBER OPTIC CONNECTOR

[75] Inventors: Frank P. Cefarelli; Robert T. Evans, both of Poughkeepsie, N.Y.

[73] Assignee: International Business Machines Corp., Armonk, N.Y.

[21] Appl. No.: 263,237

[22] Filed: May 13, 1981

[51] Int. Cl.³ .............................................. G02B 7/26
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,922,064 | 11/1975 | Clark et al. | 350/96.22 |
| 3,982,815 | 9/1976 | Nakayama | 350/96.22 |
| 3,999,837 | 12/1976 | Bowen et al. | 350/96.22 |
| 4,008,948 | 2/1977 | Dalgleish et al. | 350/96.21 |
| 4,056,305 | 11/1977 | McCartney et al. | 350/96.21 |
| 4,185,886 | 1/1980 | Corrales | 350/96.21 |
| 4,214,810 | 7/1980 | Stewart | 350/96.21 |
| 4,214,812 | 7/1980 | de Mendez | 350/96.21 |
| 4,252,406 | 2/1981 | Ryan, Jr. et al. | 350/96.21 |
| 4,277,135 | 7/1981 | Schrott et al. | 350/96.21 |
| 4,312,564 | 1/1982 | Cefarelli et al. | 350/96.22 |

*Primary Examiner*—John D. Lee
*Attorney, Agent, or Firm*—Douglas R. McKechnie

[57] ABSTRACT

A fiber optic connector couples multiple pairs of single fiber, fiber optic transmission lines. The connector includes identical sub-assemblies releasably coupled. Each sub-assembly has a plurality of holders to which the ends of the fibers are connected. Each holder has a plug and a receptacle fitted into corresponding elements on an aligned holder so as to position the ends of mating fibers in axial alignment for efficient transmission of light energy therebetween. The holders are mounted in a loose arrangement and an elastomeric pad or cushion suspends mated holders. Excessive coupling forces are transmitted through the housings directly and do not affect the holders and fibers carried thereby.

12 Claims, 8 Drawing Figures

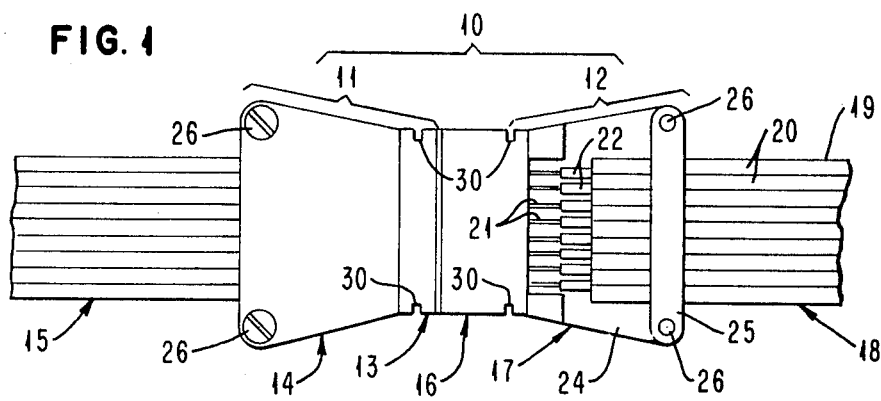
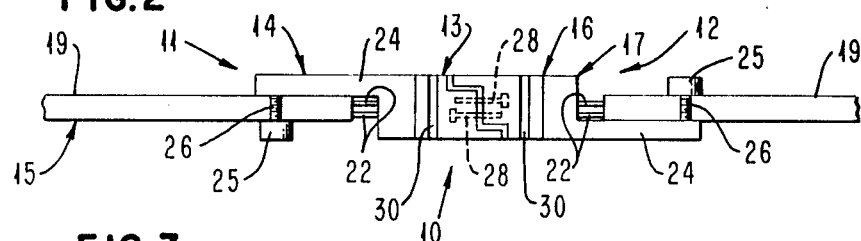
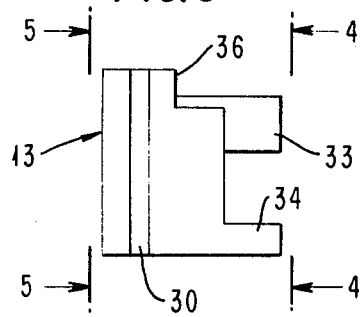
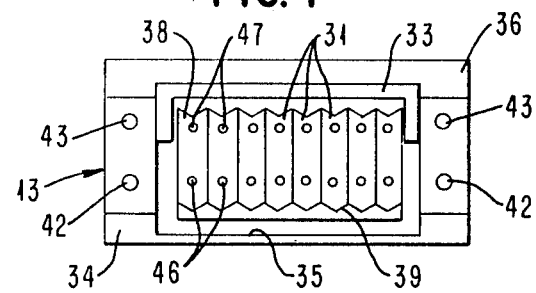
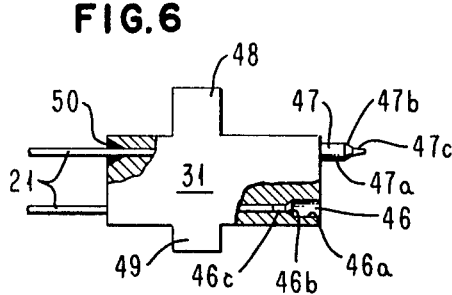
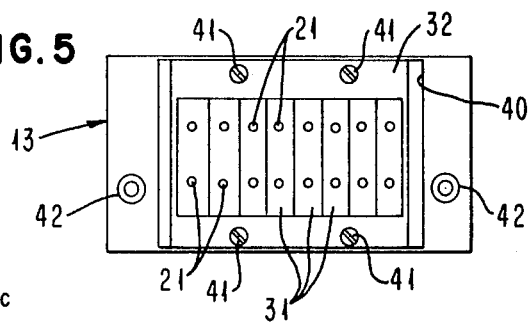

FIBER OPTIC CONNECTOR

FIELD OF THE INVENTION

This invention relates to improvements in fiber optic connectors and, more particularly, to separable connectors of the type in which multiple pairs of single strands or fibers are coupled to minimize light energy losses at the coupling.

BACKGROUND OF THE INVENTION

Fiber optic devices use single or multiple strands or fibers each having an inner circular glass core coated with a circumferential cladding having a different index of refraction. Light is transmitted along the core and totally reflected from the interface between the core and cladding. Such devices can be used as transmission lines for transmitting information bearing light energy. A transmission line can be formed from a single fiber or it can include a plurality of fibers bundled together as a cable. Additionally, several transmission lines can be arranged in parallel for the simultaneous transmission of information along each of the separate lines.

Where the transmission line is relatively long and extends between different pieces of apparatus, the transmission line is broken down into segments and the different segments are connected to each other by use of separable fiber optic connectors which have been developed to meet this need. The principal design criteria of such connectors is to connect the transmission lines in an end-to-end relationship in such a manner as to minimize the loss of light energy as light traverses from one end of one line into the end of the adjacent segment of that line. The most efficient transfer of energy occurs when the axis of the two lines are in alignment. In other words, if the ends of the lines are out of alignment either due to a lateral displacement or to the fact that there is a slight angular displacement, light energy will be lost. Thus, most fiber optic connectors are designed to bring the ends of the transmission lines into as perfect an axial alignment as possible.

When a transmission line is made up of a plurality of individual fibers joined together to form a bundle or cable for the transmission of a single piece of information along the line, it is not critical or necessary that the individual fibers be aligned exactly with the ends of the fibers on the other cable since most of the light emitting from one end will be accepted into the fibers on the other side. However, where a transmission line is made up of a single individual fiber, it is more critical that the end of one be perfectly aligned with the end of the other to minimize energy loss. This problem becomes even more critical where there are several transmission lines connected in parallel to one another by means of the connector through which all of the lines pass. Due to differences in manufacturing tolerances, while one transmission line might be perfectly aligned, another one might be out of alignment. The state-of-the-art relevant to the invention is exemplified in the U.S. patents now to be discussed.

Three patents will now first be discussed as showing the state-of-the-art relative to connectors for transmission lines formed from cables or bundles of fibers.

U.S. Pat. No. 3,922,064—Clark et al discloses a "Self-aligning Optical Waveguide Connector" for a transmission line formed from a cable or bundle of fibers. The connector is for a single cable and includes provision of allowing both axial and lateral movement of the ends of at least one of the cable segments during the mating process. U.S. Pat. No. 3,999,837—Bowen et al discloses a "Light Transmitting Fiber Bundle Connector" one embodiment of which is designed to connect a single transmission line and the other embodiment (FIG. 12) connects a plurality of transmission lines in parallel. U.S. Pat. No. 3,982,815—Nakayama shows a "Connector For Light Transmitting Cables" in which a single transmission line is connected by means of a connector formed of identical parts. In one embodiment (FIG. 4), the ends of one transmission line is spring biased to allow for some axial movement during the mating process.

The art of connectors for single fibers or strands is exemplified by the following U.S. patents. U.S. Pat. No. 4,008,948—Dalgleish discloses "Optical Fibre Connectors" for either a single transmission line or plural parallel transmission lines. The ends of the individual lines are aligned in a specially shaped male member. U.S. Pat. No. 4,056,305—McCartney et al shows a "Single Optical Fiber Connector Utilizing Elastomeric Alignment Device" for single and plural transmission lines. The ends of the individual fibers are brought into alignment by being passed through cylindrical guides biased by a surrounding elastomeric alignment element. U.S. Pat. No. 4,214,810—Stewart discloses a "Method of Connecting Optical Fibers" in which, as best shown in FIG. 5 thereof, two parallel transmission lines each terminate in one holder so that when the holders are brought together using alignment pins, the ends of the fibers are properly aligned. U.S. Pat. No. 4,215,913—Turley et al discloses "Optical Fibre Connectors" for a single transmission line having self-centering guide means for causing alignment of the ends of the transmission line.

SUMMARY OF THE INVENTION

We previously filed U.S. patent application Ser. No. 862,077 on Dec. 19, 1977 for a "Multi-Fiber Optic Connector" (also assigned to the assignee of this application) now U.S. Pat. No. 4,312,564, and the present invention was designed as an improvement upon our prior invention disclosed in such application. In such invention, two hermaphroditic housings carry a plurality of pairs of single fibers to be respectively coupled in such a manner as to have a high efficiency (low energy loss) connection. Each housing is identical and is constructed as a unitary element having a row of male members or plugs and a row of receptacles, through which the fibers extend. The male members and receptacles are specially shaped to bring the ends of mating pairs of fibers into end-to-end alignment. Because the diameters of the individual fibers are relatively small, the connector has to be built with tight, close or small tolerances to achieve a highly efficient connector. Such tolerances are difficult and costly to achieve especially in view of the fact that each housing is one piece. Another problem might arise during mating due to the fact that the forces which move the mating parts together and hold them are transmitted through the male members and receptacles with the result that some fiber ends might be forced out of alignment to thereby reduce coupling efficiency. The present invention was designed to avoid these problems and improve not only upon such prior invention but upon the prior art.

Briefly, in accordance with the invention, a fiber optic connector has two housings each of which carries a plurality of identical holders attached to the ends of the single fibers to be coupled. Each holder and fiber carried thereby is aligned with a mating holder and fiber in the other housing, when the connector is coupled, with the fiber ends axially aligned and adjacent to each other. The holders are biased toward a first position and are shaped to allow limited movement relative to the housings before the connector is fully coupled. As the connector is coupled, the holders abut each other first and are then movable relative to the housing against the bias until the housings abut each other and provide a positive stop. During such coupling, the holders and fibers can move laterally and axially to correct for any slight mis-alignment.

One of the objects of the invention is to provide a relatively inexpensive connector for aligning and coupling the ends of multiple pairs of single fiber optic transmission lines in such a manner as to efficiently transmit energy along the coupled fibers or transmission lines.

Another object is to provide a fiber optic connector for multiple pairs of single optical fibers which minimizes or overcomes alignment problems due to variation in manufacturing tolerances.

A further object of the invention is to provide a fiber optic connector composed of two sub-assemblies both of which use identical parts so as to reduce the cost due to having to otherwise make differently shaped parts.

Still another object is to provide a fiber optic connector having specially shaped elements for aligning and connecting the ends of single mating fibers in such a manner as to limit or prevent forces from being transmitted through the fibers.

Other objects and advantages of the invention will be apparent from the following description taken in connection with the accompanying drawings wherein:

FIG. 1 is a top plan view of a fiber optic connector embodying the invention;

FIG. 2 is a side elevational view of the connector shown in FIG. 1;

FIG. 3 is an enlarged side elevational view of a housing used in the embodiment shown in FIG. 1;

FIG. 4 is an end elevational view of a housing looking along line 4—4 of FIG. 3;

FIG. 5 is an end elevational view looking along lines 5—5 of FIG. 3;

FIG. 6 is a side elevational view, partly in section and broken away, of a holder used in the invention shown in FIG. 1;

DETAILED DESCRIPTION

Figure 7:
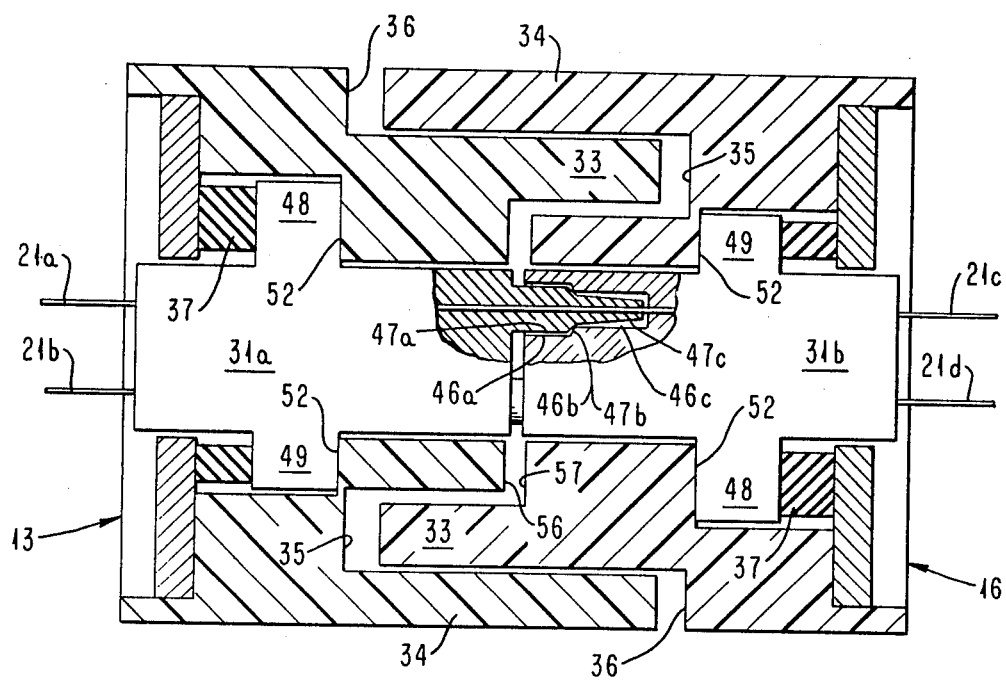
FIG. 7 is a greatly enlarged view, partly in section, through a portion of the connector showing details and the arrangement of parts at one point during the coupling process.

With reference to FIGS. 1 and 2, a fiber optic connector 10 comprises two identical sub-assemblies 11 and 12 for joining cables 15 and 18 which, as discussed below, contain parallel, fiber optic, single-fiber transmission lines. Sub-assembly 11 includes a housing 13 and support 14. Similarly, sub-assembly 12 comprises a housing 16 and support 17 identical to 13 and 14 respectively.

Cable 18 includes an elongated, flat, rubber-like, protective covering 19 of elongated rectangular cross-section provided with a series of slits through which a plurality of single fiber transmission line segments 21 can be inserted into the body of 19. Each fiber 21 has a circular glass core provided with a circumferential cladding and operates upon the fiber optic principle of total reflection to transmit light energy therealong. Protective coverings 22 surround fibers 21 within body 19. The ends of fibers 21 extend beyond the ends of coverings 22, as shown in FIG. 1, and have short unsupported sections before entering housing 16. Cable 15 is identical in construction. Both cables, in the illustrated embodiment, carry sixteen fibers 21 arranged in two rows of eight fibers in each row. When the segments in each cable are joined by connector 10, they form sixteen independent single fiber transmission lines for the transfer of information bearing light energy.

Support 14 includes a flat, fan shaped body 24 upon which the end of cable 18 rests. A cross-bar 25 extends across one side of body 19. Two screws 26 are connected between the ends of cross-bar 25 and body 24 and lightly clamp body 19 therebetween in such a manner as not to bend or deform the fiber optic lines 21 passing therethrough. Support 17 is formed in an identical manner and like parts bear like reference numerals. Supports 14 and 17 are respectively connected to housings 13 and 16 by screw means (not shown) and housings 13 and 16 are connected to each other by screw means 28 (FIG. 2) which hold connector 10 together yet allow it to be separated. Quite obviously, other forms of releasable or separable connecting means can be used.

Figure 8:
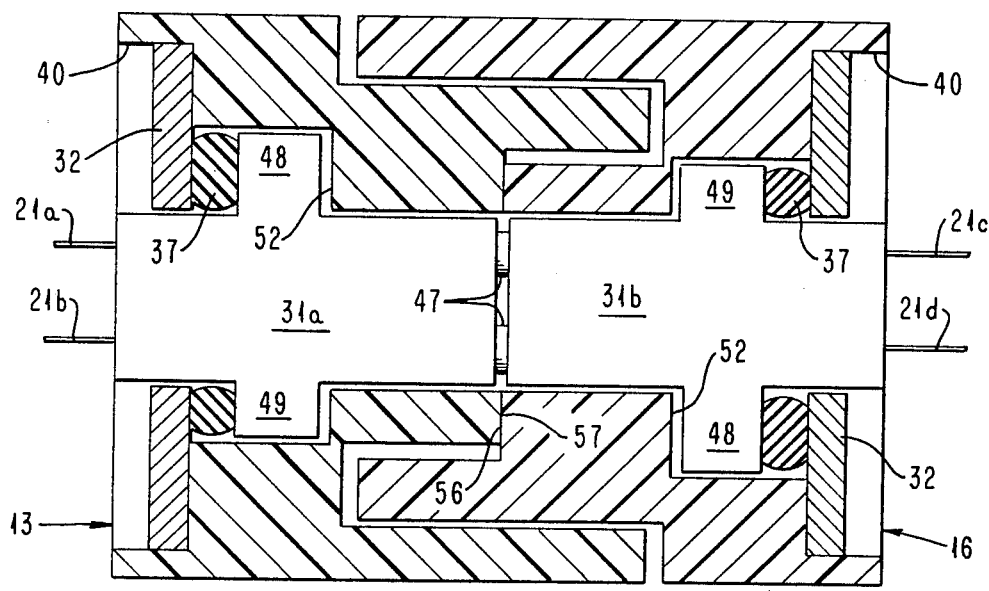
FIG. 8 is a view similar to FIG. 7, but showing the arrangement of the parts when coupling is completed.

Housing 13 and 16 are each of a molded plastic material and are of identical construction so that only one need be described in detail. With reference primarily to FIGS. 3-5, housing 13 comprises a pair of parallel slots 30 by means of which connector 10 may be mounted on the apparatus through which the transmission lines extend in such a manner, for example, that a sheet metal flange would fit into slots 30. Mounted within housing 13 are eight identical holders 31, a plate 32, and an elastomeric biasing means or cushion 37 (FIGS. 7 and 8). Housing 13 has two sides, the connector side shown in FIG. 4 and the cable side shown in FIG. 5. On the connector side, an inverted U-shaped lip 33 overhangs a U-shaped lip 34. Adjacent to lip 34, housing 13 has a U-shaped recess 35 adapted to receive the lip 33 of mating housing 16. Adjacent lip 33, housing 13 is open at 36 so as to receive the corresponding lip 34 of housing 16 when the two housings are brought together. The hermaphroditic shapes of lips 33 and 34, slot 35 and area 36 permit the two housings to be joined together, mated or interfitted only when they are in a predetermined, aligned, orientation. The dimensions of the housing provide a loose interfit allowing some degree of relative angular and lateral movement during mating. This thus provides for a coarse alignment of holders 31 and fibers 21 when the housings are initially brought together. The central part of housing 13 is open so as to receive holders 31. As viewed in FIG. 4, the upper edges of holders 31 have shallow V-shaped faces fitted into upper serrated edge 38 of the opening in housing 13, and the lower edges are bevelled or V-shaped and fit into a lower serrated edge 39. The clearances between the holders 31 and between the holders and the housing, including edges 38 and 39, provide a loose fit and permits the holders to freely move during the mating process. In other words, holders 31 are loosely mounted side-by-side in housing 13.

On the cable side (FIG. 5), housing 13 has a recess 40 into which plate 32 is placed and secured by screws 41.

The cable side ends of holders 31 pass throgh plate 32 as shown in FIGS. 7 and 8. Two laterally spaced counterbored holes 42 extend from the cable side through housing 13 and are adapted to receive two screws 28 for releasably fastening the holders (and connector) together. On the connector side (FIG. 4), housing 13 further has two laterally spaced blind holes 43 which would receive the threaded ends of screw 28 mounted in the other housing. Holes 43 are either threaded or screws 28 can be self-tapping.

With reference to FIG. 6, each holder 31 is of a molded plastic and has an elongated relatively flat body of generally rectangular cross-section through bores of which two parallel fibers 21 extend. One fiber terminates at the end of a plug 47 and the other fiber terminates at the end or bottom of a receptacle 46. Each fiber 21 is of circular cross-section and has an end or end face perpendicular to the axis of the fiber. During assembly of a holder 31, fibers 21 are inserted into the bores of the body until the ends terminate at the ends of the plug and receptacle and then a potting compound is added at 50 to secure each fiber.

Plug 47 is coaxial with fiber 21 passing therethrough and has an enlarged base 47a, a tapered medial locating shoulder 47b and a tapered end portion or tip 47c of reduced diameter relative to sections 47a and b. Receptacle 46 has an enlarged outer bore 46a, a tapered shoulder 46b and an inner bore 46c which are circular in cross-section and have an axis that is aligned with the axis of adjacent fiber 21. The shapes of plug 47 and receptacle 46 are complementary in that each plug is designed to fit into a corresponding receptacle on the other holder. Bore 46c has a circular edge, formed at the intersection of bore 46c and shoulder 46b, of a diameter between the inner and outer diameters of a shoulder 47b. During the mating process, such edge abuts shoulder 47b in a circular line contact therewith and precisely aligns the ends of the associated fibers. During mating, should there be any initial misalignment, shoulder 47b acts as a wedge against the edge of bore 46c and causes a lateral shift between the plug and receptacle to bring them into axial alignment. When fully coupled, the adjacent ends of the fibers are spaced apart a slight distance such as 0.025 millimeters while the axes of the fibers are in exact alignment and the end faces of the fibers are parallel to each other. The reason for not having the fibers touch one another is to prevent any abrasion that might occur due to repeated coupling and decoupling of the fibers. While there might be a small amount of energy lost as a result, the amount so lost would not be significant relative to the information being transmitted by the light energy. In addition, such loss if excessive in a particular application, can be overcome by the use of suitable fluids filling the gap and transmitting the light across the gap more efficiently.

Referring to FIG. 7, cushion 37 is interposed between plate 32 and each holder 31a. In FIGS. 7 and 8, the numerals 31a and 31b are used to more specifically designate each of the respective holders for understanding the explanation described below. In the uncoupled position, cushion 37 bears against the cable side of tabs 48 and 49, there being a hole through the cushion through which the cable side of tab 31a extends. Cushion 37 biases tabs 48 and 49 towards abutment with a surface 52 on holder 13. During the coupling process described below, holder 31a is moved to the left, as viewed in FIG. 7, towards the position shown in FIG. 8 wherein tabs 48 and 49 disengage from surface 52 while compressing cushion 37 still further. Upon separation or release of the mated connector, cushion 37 will cause the holders to move to the position shown in FIG. 7.

Further structure details are best understood relative to the functions they perform during movement of subassemblies 11 and 12 from an uncoupled position into the coupled position. At the start of the coupling operation, sub-assemblies 11 and 12 are brought into rough alignment with the connector sides of housings 13 and 16 facing each other, the one sub-assembly being oriented 180° or upsidedown relative to the other. In such positions, holders 31 on each housing are aligned with each other. The sub-assemblies are then pushed or moved towards each other and at the same time the lips 33 and 34 of each are interfitted into spaces 36 and 35 on the other. These lips and spaces form a rough guiding means to bring the housings 31a and 31b into rough alignment whereby the reduced or tapered tips 47c of the lugs are free upon further movement to enter into bores 46a of the receptacles. To accomplish this function, it is obvious that the length of lips 34 and 33 have to be slightly longer than the lengths of plugs 47 so that the rough alignment occurs first before the plugs can enter the receptacles. As further movement occurs, tips 47c of the plugs penetrate further into the receptacles until shoulder 47b contacts the edge of bore 46c. There is sufficient clearance around each holder 31 so that should there be some slight lateral misalignment, the tapered tip 47c and eventually shoulder 47b would slide along the receptacle and cause a slight lateral shifting of the holders until they come into the exact alignment. When shoulder 47a is seated, as shown in FIG. 7, further movement of the sub-assemblies towards each other causes the housings 13 and 16 to move until transverse face 56 on housing 13 engages transverse face 57 on housing 16 as shown in FIG. 8. During such continued movement, holders 31a and 31b are stationary relative to each other but move relative to the respective housings against the bias of cushions 37. At this point, the sub-assemblies are fully coupled or mated and screws 28 can be added to attach the housings together and releasably join connector 10. During relative movement between the holders and housings, fibers 21 are free to flex along their unsupported portions previously discussed, adjacent to the housings. It should also be noted that during the coupling process, the end face of fiber 21a does not contact the end face of 21c but is spaced as shown in FIG. 7 and previously described. The ends of fibers 21b and d are similarly spaced. Thus, no force is transmitted along the fibers due to any abutting contact. The plugs 47 encounter some force due to contact with shoulders 46b and such force is a function of the amount of bias due to cushion 37. Such bias is chosen so as to permit the above described movement to occur. When fully coupled, cushions 37 suspend holders 31a and 31b axially therebetween the cushion any axial vibrations that might be imparted to the connector 10 and thereby minimize any movement that might occur as a result. As seen in FIG. 8, the lengths of holders 31a and 31b are such that the cable sides are indented or flush with the cable sides of the housings, when the connector is fully coupled, so as not to project beyond the ends, e.g., and hit the supports (FIG. 1).

Furthermore, as cushions 37 compress upon separation of surfaces 56 and 57, an axial bias force is created tending to separate the holders. Such force is overcome by the connecting or holding forces of screws 28. When surfaces 56 and 57 become engaged, a positive stop is created so that holding or connecting forces in excess of the biasing force are transmitted directly between the housings and not through the holders. Thus, the forces transmitted through the holders are only those biasing forces developed by cushions 37 acting on the holders.

In the design of the connector, the portions requiring the greatest precision and the "tightest" manufacturing tolerances, are the relative locations of edge of bore 46c and shoulder 47b within each holder. These locations have to be relatively precise so that the axis of a plug and receptacle align properly and thereby bring the fibers 21 extending therethrough into axial alignment. This precision can be aided by having all of the holders manufactured on a single die. The next order of precision is quite a bit less in that the holders are loosely interfitted side-by-side within the housings only to the extent that tips 47c of the plugs initially are free to enter enlarged bore 46a of the receptacles. Thus, there need not be any critical lateral tolerance across the various holders because of the self-aligning nature that occurs during the coupling process. In contrast to our prior invention described above, the plugs and receptacles therein are formed as an integral one-piece body and therefore requires a continuously tight tolerance throughout the entire structure in order to precisely bring each of the fibers into the exact axial coupling alignment. The plugs 47 described above are of solid construction. However, the tips 47c may be split as described in the above mentioned co-pending application.

It is obvious that many other changes can be made in the details and arrangement of parts without departing from the invention.

Another advantage of the invention is that the parts of each sub-assembly 11 and 12 are identical and thus can be made more inexpensive because of higher volume production and the need for lower inventory of parts.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. In a fiber optic connector for optically coupling a plurality of pairs of single fibers in end-to-end relationships, the combination comprising:

first and second identical sub-assemblies releasably connected to each other and being movable between connected and disconnected positions;

releasable means for holding said sub-assemblies in said connected position;

first and second identical housings interfitted with each other and forming respective parts of said first and second sub-assemblies, said housings having first aligning means allowing movement of said sub-assemblies into said connected position only when said housings are in a predetermined orientation relative to each other;

first and second sets of identical holders respectively loosely mounted in said first and second housings in an abutting side-by-side relationship, said holders in each set being movable relative to each other, each holder having a plug and a receptacle, each holder being connected to two fibers with one fiber extending through such holder and terminating at the end of said plug and with the other fiber extending through said holder parallel to said one fiber and terminating at the end of said receptacle, and first and second sets of holders being interfitted with each other with said plugs of said first set mated with receptacles of said second set and said plugs of said second set mated with receptacles of said first set, said holders having second aligning means whereby the ends of said fibers in said first set are optically aligned with and coupled to the ends of said fibers in said second set, for the efficient transmission of light energy between aligned fibers;

said first aligning means being operative when said housings are in said predetermined orientation, to further coarsely align the ends of each pair of fibers;

and first and second biasing means in said first and second sub-assemblies biasing said first and second sets of holders in a first direction toward engagement with first portions of said first and second housings while allowing movement of said holders in a direction opposite to said first direction and laterally thereof during movement of said sub-assemblies into said connected position, said second aligning means being operative during such movement of said sub-assemblies to laterally shift individual ones of said holders so as to exactly axially align all pairs of said fibers.

2. The combination of claim 1 wherein said second aligning means comprising:
each plug has a locating and aligning first shoulder, each receptacle has a locating and aligning edge engaged with one of said first shoulders, each engaged shoulder and edge positioning the associated fibers in axial alignment with each other.

3. The combination of claim 2 wherein:
each aligned pair of fibers has two faces at the ends of such fibers, said faces being parallel to each other and perpendicular to the axes of such fibers.

4. The combination of claim 2 wherein:
each plug is coaxial with the fiber extending therethrough and has a tip of reduced diameter, a medial tapered shoulder forming said first shoulder, and a base portion of enlarged diameter; each receptacle has an outer portion of enlarged diameter surrounding said base, a medial tapered shoulder, and an inner portion of reduced diameter surrounding said tip and intersecting said medial tapered shoulder to form said locating and aligning edge.

5. The combination of claim 1 wherein:
said holders are movable relative to each other and to said housings;
and said tips are tapered;
each said tip and said first shoulder being operative during interfitting movement thereof into an aligned receptacle to shift said associated holders laterally and eliminate any axial misalignment between the associated pair of fibers.

6. The combination of claim 1 wherein:
said biasing means tends to force said sub-assemblies out of said mated relationship;
said sub-assemblies further including releasable fastening means holding said sub-assemblies together and providing a connecting force greater than forces generated by said biasing means;

said housings further having abutting stop faces preventing any forces in excess of said forces generated by said biasing means, from acting on said holders.

7. In a fiber optic connector for optically coupling a plurality of pairs of single fibers to form a plurality of parallel, fiber optic transmission lines, the combination comprising:

first and second housings movable relative to each other between connected and disconnected positions, said housings having aligning means thereon allowing movement of said housings into said connected position only when said housings are in a predetermined orientation relative to each other, said housings having first and second central openings aligned in said connected position;

releasable means for holding said housings in said connected position;

a plurality of first holders loosely mounted side-by-side in said first opening, said holders corresponding in number to the number of pairs of said single fibers, a like plurality of second holders mounted side-by-side in said second opening and aligned with said first holders in said connected position and when said housings are in said predetermined orientation, each of said second holders being associated with one of said first holders; said fibers being connected to said holders so that one fiber of each pair is connected to a first holder and the other fiber of such pair is connected to the associated second holder, said aligning means being operative to coarsely align the associated fibers of each pair when said housings are in said predetermined orientation;

each first holder having a plug coaxial with said fiber connected thereto and provided with a concentric tapered first shoulder, each second holder having a receptacle provided with a circular edge engagable with said first shoulder in said first holder and operative upon movement of said housings into said connected position to laterally move said first and second holders so as to move the ends of the fibers connected to such holders, from positions of coarse axial alignment into positions of exact axial alignment, and biasing means in said first and second housings biasing said first and second holders towards each other in said connected position to maintain said first shoulder and said edge engaged, said biasing means further biasing said first and second holders into engagement with portions of said first and second housings, when in said disconnected position, said biasing means allowing said holders to move laterally and longitudinally relative to said housings upon movement thereof from said disconnected position into said connected position.

8. The combination of claim 7 comprising:
a first plate connected to said first housing;
a first elastomeric cushion held between said first plate and said first holders;
a second plate connected to said second housing;
and a second elastomeric cushion held between said second plate and said second holders;
said biasing means comprising said first and second cushions.

9. The combination of claim 7 wherein:
said biasing means generates a first force tending to move said housings from said connected position, and said releasable holding means generates a second force at least equal in magnitude to said first force in opposition thereto.

10. The combination of claim 9 wherein:
said first and second housings having portions thereof abutted in said connected position and operative to prevent any portion of said second force greater than said first force from being transmitted through any of said plugs and receptacles.

11. The combination of claim 7 wherein:
each plug is rigid and has a cylindrical base, and a tapered tip, said first shoulder extending between said base and said tip;
and each receptacle having an outer portion, an inner portion, and a second shoulder extending between said outer portion and said inner portion and forming said circular edge.

12. The combination of claim 7 comprising:
a further like plurality of second pairs of fibers;
each holder having a plug and a receptacle interfitted into a receptacle and a plug on an aligned holder;
all of said fibers being connected so that each holder is connected to two fibers.

* * * * *